(12) United States Patent
Higashi et al.

(10) Patent No.: US 10,424,322 B2
(45) Date of Patent: Sep. 24, 2019

(54) MAGNETIC HEAD AND MAGNETIC RECORDING MEDIUM PROCESSING DEVICE

(71) Applicant: NIDEC SANKYO CORPORATION, Nagano (JP)

(72) Inventors: Katsuhisa Higashi, Nagano (JP); Yohei Shimizu, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/089,386

(22) PCT Filed: Mar. 8, 2017

(86) PCT No.: PCT/JP2017/009308
§ 371 (c)(1),
(2) Date: Sep. 28, 2018

(87) PCT Pub. No.: WO2017/169600
PCT Pub. Date: Oct. 5, 2017

(65) Prior Publication Data
US 2019/0130935 A1  May 2, 2019

(30) Foreign Application Priority Data

Mar. 31, 2016 (JP) ................................. 2016-070486

(51) Int. Cl.
*G11B 5/00* (2006.01)
*G11B 11/10* (2006.01)
(Continued)

(52) U.S. Cl.
CPC ............ *G11B 5/00808* (2013.01); *G06K 7/08* (2013.01); *G11B 5/09* (2013.01); *G11B 5/105* (2013.01); *G11B 5/17* (2013.01); *G11B 5/3109* (2013.01)

(58) Field of Classification Search
CPC ... G11B 5/00; G11B 11/10; G11B 2005/0021; G11B 5/39; G11B 2209/00
(Continued)

(56) References Cited

U.S. PATENT DOCUMENTS 8,320,074 B2 * 11/2012 Shiomi .................. G06K 7/084
360/110

FOREIGN PATENT DOCUMENTS

CN   101960524   1/2011
CN   102208006   10/2011
(Continued)

OTHER PUBLICATIONS

"International Search Report (Form PCT/ISA/210)", dated May 16, 2017, with English translation thereof, pp. 1-4.
(Continued)

*Primary Examiner* — Nabil Z Hindi
(74) *Attorney, Agent, or Firm* — JCIPRNET (57) ABSTRACT

This magnetic head, which reads and writes magnetic information, prevents a signal from being read between the magnetic head and the write circuit during reading of magnetic information. A card reader 1 is provided with a magnetic head 6 which reads and writes magnetic information. Bidirectional diodes 54A, 54B are arranged inside of a head case 21 of the magnetic head 6. A write signal from a write circuit 72 is inputted via the bidirectional diodes 54A, 54B to a writing coil 34 wound around a core 32 of the magnetic head 6. The bidirectional diodes 54A, 54B and a demodulation IC 61 are mounted on a first board surface 62A of a control circuit board 62, and the control circuit board 62 is fixed to the head case 21 so that the bidirectional diodes 54A, 54B and the demodulation IC 61 are covered by the head case 21.

6 Claims, 4 Drawing Sheets

(51) Int. Cl.
  *G11B 5/008*  (2006.01)
  *G06K 7/08*  (2006.01)
  *G11B 5/09*  (2006.01)
  *G11B 5/105*  (2006.01)
  *G11B 5/17*  (2006.01)
  *G11B 5/31*  (2006.01)

(58) Field of Classification Search
  USPC .................. 360/55, 59, 266.2, 313, 137, 110
  See application file for complete search history.

(56) References Cited

FOREIGN PATENT DOCUMENTS

| | | |
|---|---|---|
| CN | 102405496 | 4/2012 |
| CN | 102473418 | 5/2012 |
| JP | S63127403 | 5/1988 |
| JP | H01169707 | 7/1989 |
| JP | H06318307 | 11/1994 |
| JP | 2010192060 | 9/2010 |
| JP | 2011040140 | 2/2011 |
| JP | 2011215748 | 10/2011 |

OTHER PUBLICATIONS

"Office Action of China Counterpart Application," dated Jun. 27, 2019, p. 1-p. 5.

\* cited by examiner

MAGNETIC HEAD AND MAGNETIC RECORDING MEDIUM PROCESSING DEVICE

CROSS-REFERENCE TO RELATED APPLICATION

This application is a 371 application of the international PCT application serial no. PCT/JP2017/009308, filed on Mar. 8, 2017, which claims the priority benefits of Japan application no. 2016-070486, filed on Mar. 31, 2016. The entirety of each of the abovementioned patent applications is hereby incorporated by reference herein and made a part of this specification.

TECHNICAL FIELD

The present invention relates to a magnetic head configured to perform reading and writing of magnetic information to a magnetic recording medium such as a magnetic card. Also, the present invention relates to a magnetic recording medium processing device including a magnetic head.

BACKGROUND ART

Patent Literature 1 describes a card processing device including a magnetic head configured to perform reading of magnetic information from a magnetic recording medium and writing of magnetic information to a magnetic recording medium. In the card processing device (a magnetic recording medium processing device) according to Patent Literature 1, the magnetic head includes a core that is provided with a gap, a reading coil and a writing coil that are wound on the core, a demodulation circuit configured to demodulate an analogue signal output from the reading coil, and an encryption circuit configured to encrypt a demodulated signal output from the demodulation circuit. The magnetic head detects variations of a magnetic field when a magnetic card (magnetic recording medium) passes the gap, and outputs a signal encrypted by the encryption circuit. An output terminal from which the encrypted signal (a read signal) is output and an input terminal to which a writing signal (write signal) is input are provided at the magnetic head.

CITATION LIST

Patent Literature

Patent Literature 1: Japanese Unexamined Patent Application Publication No. 2011-215748

SUMMARY OF THE INVENTION

Problems to be Solved by the Invention

In the card processing device according to Patent Literature 1, the writing coil is connected to a write circuit provided at an outside of the magnetic head. Here, in the magnetic head including the reading coil and the writing coil that are wound on the same core, when an electric current flows through the reading coil, an electric current corresponding to the electric current of the reading coil also flows through the writing coil. Then, the electric current (an analogue signal) is output, not via the encryption circuit, from the input terminal toward the write circuit. That is, when an encrypted read signal is output from the output terminal of the magnetic head, an analogue signal corresponding to the read signal is also output from the input terminal of the magnetic head toward the write circuit, but the analogue signal is not encrypted. Therefore, the signal not encrypted between the input terminal of the magnetic head and the write circuit may be read.

In view of the problem described above, an object of the present invention is to provide a magnetic head configured to perform reading and writing of magnetic information and designed to prevent a signal from being read between the magnetic head and a write circuit at the time of reading of magnetic information.

Means for Solving the Problem

In order to solve the above problem, a magnetic head according to the present invention includes: a head body including a core that is provided with a gap and a reading coil and a writing coil that are wound on the core; a head case housing the head body; a demodulation circuit connected to the reading coil and an encryption circuit connected to the demodulation circuit; and a bidirectional diode connected to the writing coil. The bidirectional diode is arranged in the head case, and a write signal is input via the bidirectional diode to the writing coil.

According to the present invention, the bidirectional diode is arranged in the head case of the magnetic head, and the write signal is input via the bidirectional diode to the writing coil. Here, a voltage level (approximately 10 mV) of an analogue signal output from the writing coil is lower than a forward direction voltage (approximately 1 V) of the bidirectional diode; therefore, the analogue signal output from the writing coil cannot pass the bidirectional diode. Consequently, even when the analogue signal corresponding to a signal output from the reading coil is output from the writing coil at the time of reading of magnetic information by the reading coil, the analogue signal does not pass the bidirectional diode. In other words, according to the present invention, the analogue signal corresponding to the signal output from the reading coil can be prevented by the bidirectional diode from being output from the writing coil to the outside of the magnetic head. Meanwhile, if the write signal is set so as to exceed the forward direction voltage, the write signal can be input to the writing coil. Therefore, in the magnetic head that performs reading and writing of magnetic information, without performing a circuit switching operation, a signal not encrypted can be prevented from being output from the magnetic head. Consequently, the signal is prevented from being read between the magnetic head and a write circuit.

In the present invention, the magnetic head may include a circuit board equipped with a first board surface on which the bidirectional diode is mounted. The circuit board may be configured such that at least a region of the first board surface on which the bidirectional diode is mounted is covered by the head case. As just described, the bidirectional diode is mounted on the circuit board and thereby routing and connecting of the bidirectional diode to the magnetic head are facilitated.

In the present invention, the demodulation circuit may be mounted on the first board surface, and the first board surface may be configured such that at least a region on which the demodulation circuit and the bidirectional diode are mounted is covered by the head case. As just described, the demodulation circuit and the bidirectional diode are mounted on the common circuit board. Therefore, the structure of the magnetic head can be simplified, and assembling, and routing and connecting are facilitated. Also, the magnetic head can be downsized.

In the present invention, the head case may include an opening. The circuit board may be fixed to the head case such that the first board surface faces toward the head case while closing the opening. The circuit board may be configured such that the encryption circuit is mounted on a second board surface provided on a back side of the first board surface. With such a configuration, the encryption circuit can be arranged at the outside of the head case; therefore, the head case can be downsized. Consequently, the magnetic head can be downsized.

In the present invention, a resin may be filled into the head case. With such a configuration, components arranged in the head case can be easily fixed.

Next, a magnetic recording medium processing device according to the present invention includes the aforementioned magnetic head and a write circuit connected via the bidirectional diode to the writing coil of the magnetic head.

Effect of the Invention

According to the present invention, the bidirectional diode is arranged in the head case of the magnetic head, and a write signal is input via the bidirectional diode to the writing coil. Also, when an analogue signal corresponding to a signal output from the reading coil is output from the writing coil, the analogue signal can be prevented by the bidirectional diode from being output to the outside of the magnetic head.

Therefore, in the magnetic head that performs reading and writing of magnetic information, without performing a circuit switching operation, a signal not encrypted can be prevented from being output from the magnetic head. Consequently, the signal is prevented from being read from a signal line connecting the magnetic head to the write circuit.

DETAILED DESCRIPTION

Herein, a magnetic head to which the present invention is applied and a card reader including the magnetic head will be described with reference to the drawings.

(Overall Structure)

Figure 1A:
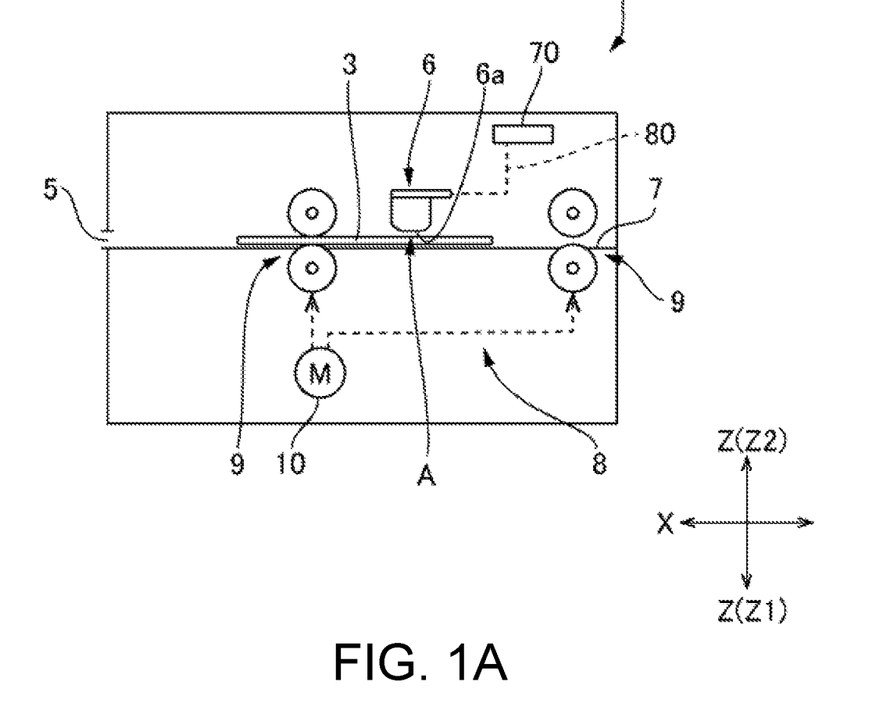
FIGS. 1A and 1B are explanatory diagrams of a card reader to which the present invention is applied and an explanatory diagram of a magnetic card.
Figure 1B:
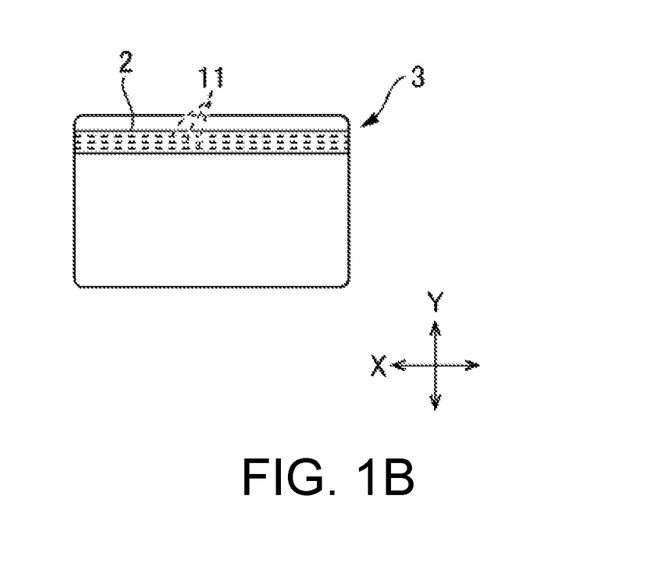

FIG. 1A is an explanatory diagram of a card reader to which the present invention is applied, and FIG. 1B is an explanatory diagram of a magnetic card to which reading and writing of magnetic information are performed by the card reader. A card reader 1 according to the embodiment of the present invention is configured to perform reading of magnetic information carried on a magnetic card (magnetic recording medium) 3 and to perform writing of magnetic information to the magnetic card 3. As illustrated in FIG. 1B, the magnetic card 3 includes a magnetic stripe 2. Three magnetic tracks 11 are provided on the magnetic stripe 2.

The card reader 1 includes a card insertion port 5, a magnetic head 6, a card conveying passage 7 extending from the card insertion port 5 via a processing position A in which the magnetic head 6 performs processing, a conveying mechanism 8 configured to convey the magnetic card 3 inserted into the card insertion port 5 along the card conveying passage 7, and a body-side board 70. The magnetic head 6 is arranged such that a sensor surface 6a faces toward the card conveying passage 7. The conveying mechanism 8 includes two pairs of conveying rollers 9 between which the magnetic card 3 is conveyed. The pairs of conveying rollers 9 are respectively arranged upstream and downstream of the processing position A. Also, the conveying mechanism 8 includes a conveying motor 10 as a drive source for the pairs of conveying rollers 9.

When the magnetic card 3 is inserted into the card insertion port 5, the card reader 1 drives the conveying motor 10 to operate the conveying mechanism 8. Thus, the magnetic card 3 is conveyed along the card conveying passage 7 to pass the processing position A. When the magnetic card 3 passes the processing position A, the magnetic stripe 2 slides on the sensor surface 6a of the magnetic head 6. At the time of reading of magnetic information carried on the magnetic card 3, the magnetic head 6 detects variations of a magnetic field when the magnetic card 3 passes the sensor surface 6a. The magnetic information output from the magnetic head 6 is encrypted. Also, at the time of writing of magnetic information to the magnetic card 3, the magnetic head 6 generates a magnetic field that magnetizes the magnetic card 3 passing the processing position A.

(Signal Processing System)

Figure 2:
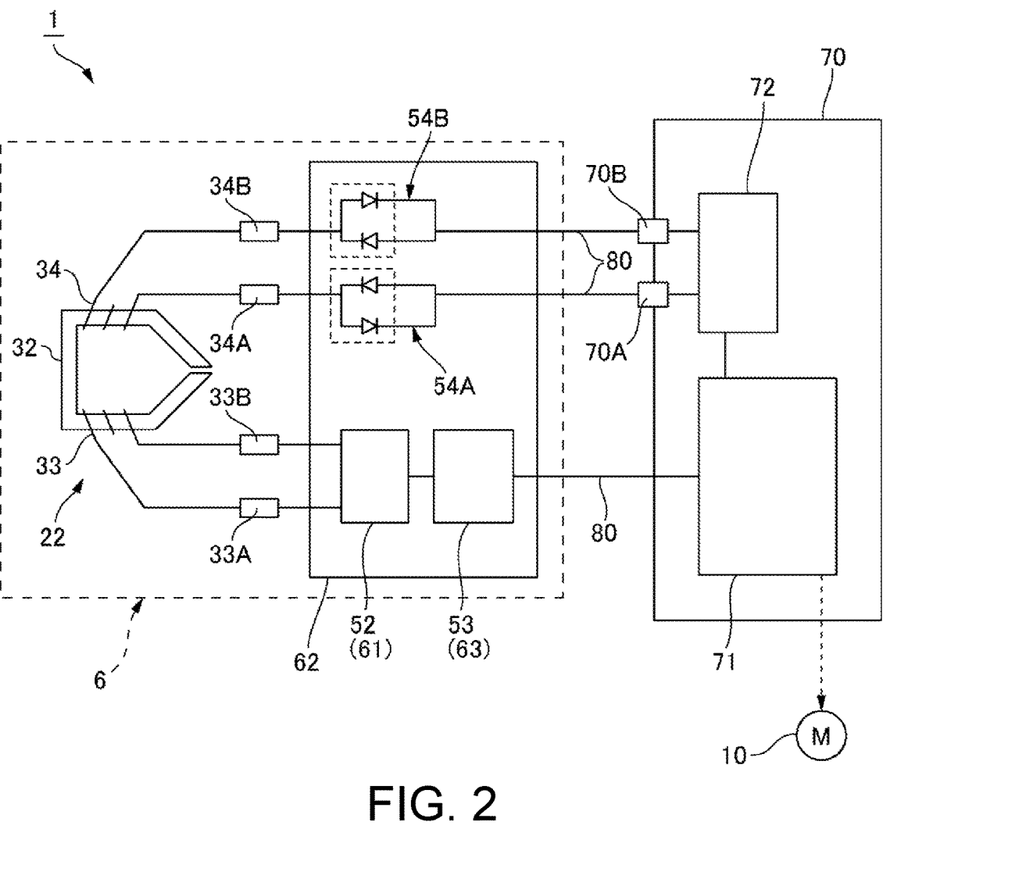
FIG. 2 is a block diagram of a signal processing system of the card reader.

FIG. 2 is a block diagram illustrating a signal processing system of the card reader 1. A body-side CPU 71 and a write circuit 72 are mounted on the body-side board 70. A detection signal from a sensor (not shown) provided in the card insertion port 5 or the card conveying passage 7 is input to the body-side CPU 71. The body-side CPU 71 outputs a control signal via a motor driver (not shown) to the conveying motor 10 and allows the magnetic card 3 to be conveyed downstream of the card conveying passage 7 and to be discharged from the card insertion port 5.

The body-side board 70 is connected via a lead wire 80 to a control circuit board 62 of the magnetic head 6. Output terminals 70A, 70B connected to the write circuit 72 are provided at the body-side board 70. The body-side CPU 71 controls the write circuit 72 to output write signals to the magnetic head 6. The write signals are output from the write circuit 72 to be input via the output terminals 70A, 70B and lead wires 80 to the magnetic head 6. Also, the encrypted magnetic information output from the magnetic head 6 is input via the lead wire 80 to the body-side CPU 71.

(Magnetic Head)

Figure 3A:
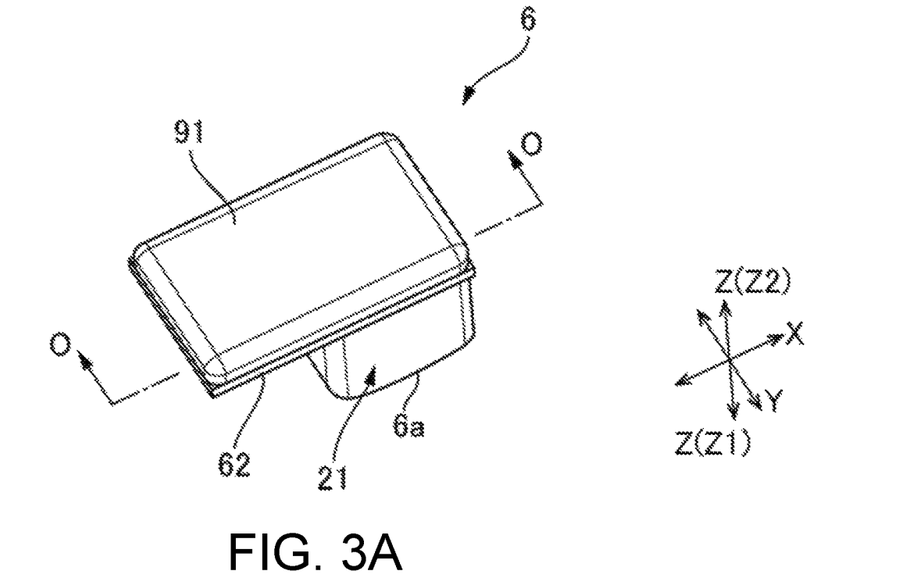
FIGS. 3A and 3B are perspective views of the magnetic head.
Figure 3B:
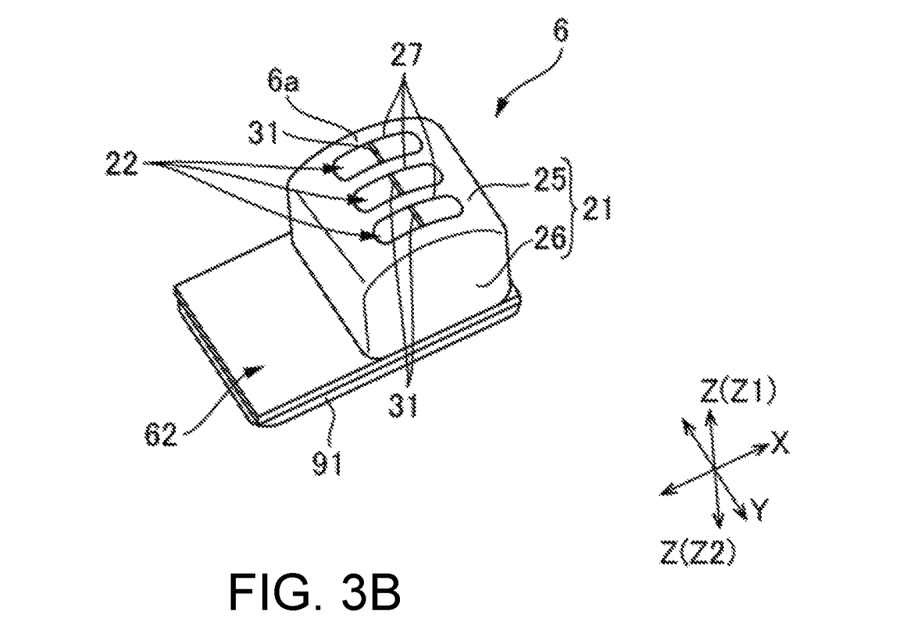
Figure 4:
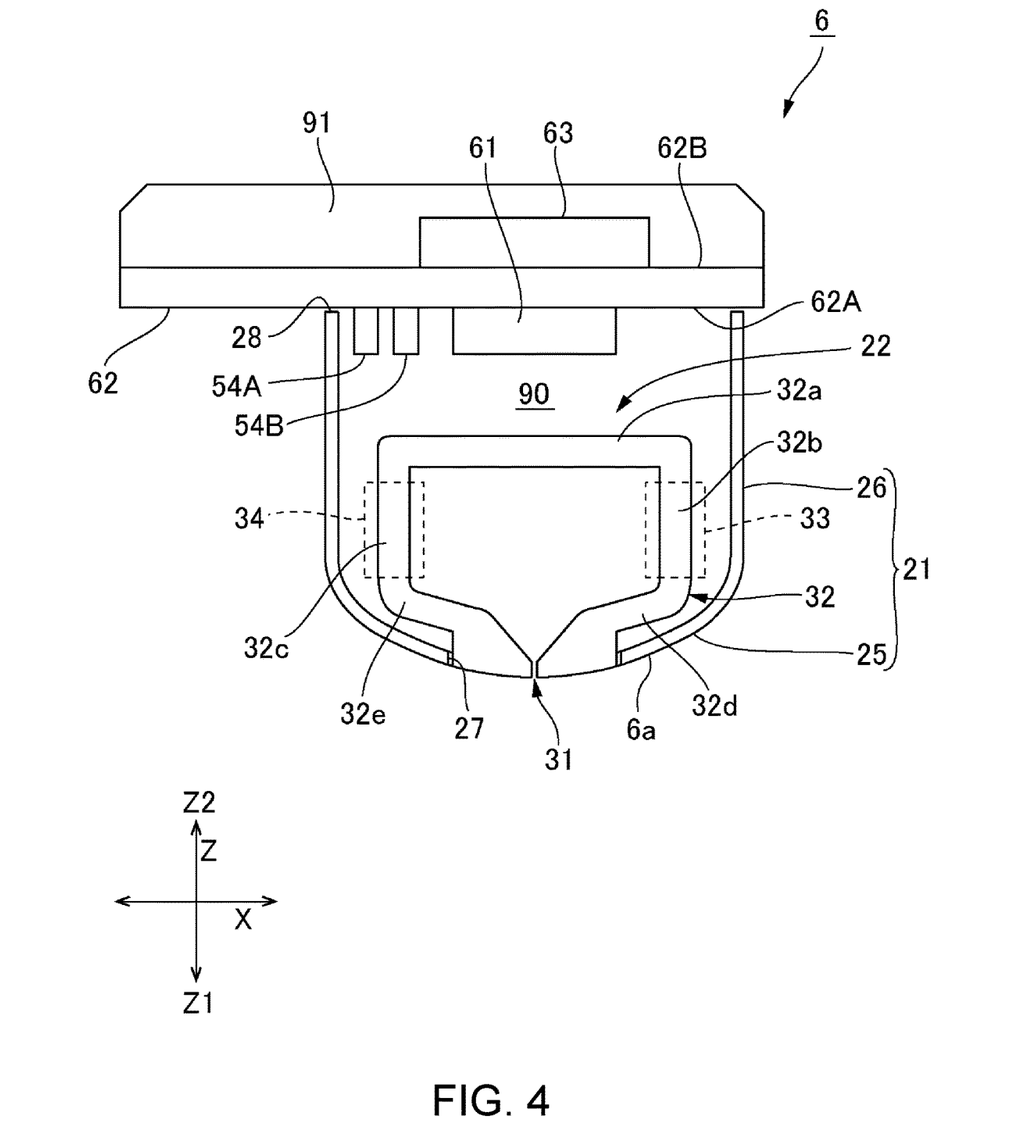
FIG. 4 is a cross-sectional view schematically illustrating an inner structure of the magnetic head.

FIGS. 3A and 3B are perspective views of the magnetic head 6. FIG. 3A is a perspective view of the magnetic head 6 when seen from the opposite side of the sensor surface 6a, and FIG. 3B is a perspective view of the magnetic head 6 when seen from the sensor surface 6a. Also, FIG. 4 is a cross-sectional view (taken along the line O-O of FIG. 3A) schematically illustrating an inner structure of the magnetic head 6.

In the following descriptions, as illustrated in FIGS. 1A and 1B, the orientation where the sensor surface 6a of the magnetic head 6 faces downward is defined as a reference orientation of the magnetic head 6, and an up-down direction in the reference orientation is defined as an up-down direction Z of the magnetic head 6. Further, a direction perpendicular to the up-down direction, Z, i.e., a passing direction in which the magnetic card 3 conveyed along the card conveying passage 7 passes the sensor surface 6a of the magnetic head 6, is defined as a front to back direction X of the magnetic head 6. Furthermore, a direction perpendicular to the up-down direction Z and the front to back direction X (the passing direction of the magnetic card 3) is defined as a width direction (a direction intersecting with the passing direction) Y of the magnetic head 6.

The magnetic head 6 is a three-channel magnetic head configured to read the three magnetic tracks 11 (see FIG. 1B) formed on the magnetic stripe 2 of the magnetic card 3. The magnetic head 6 includes a head case 21 and the control circuit board 62 fixed to the head case 21. Three head bodies 22 for reading magnetic information from the three magnetic tracks 11 are arranged at the inner side of the head case 21.

The head case 21 is made of a soft magnetic material such as permalloy. As illustrated in FIG. 3B, the head case 21 includes a rectangular bottom plate portion 25 configuring the sensor surface 6a and a square tubular portion 26 extending from an outer periphery of the bottom plate portion 25 toward an upper side Z2. An opening 28 (see FIG. 4) opened to the upper side Z2 is provided at an upper end of the square tubular portion 26. The bottom plate portion 25 of the head case 21 is formed such that an intermediate portion in the front to back direction X protrudes toward a lower side Z1, therefore having a curved shape. As illustrated in FIG. 3B, three sensor surface openings 27 are provided in the intermediate portion of the bottom plate portion 25 in the front to back direction X. The three sensor surface openings 27 are each an elongated hole extending in the front to back direction X and are arranged side by side in the width direction Y.

As illustrated in FIG. 2 and FIG. 4, each of the head bodies 22 includes a core 32 that is provided with a gap 31, and a reading coil 33 and a writing coil 34 that are wound via a coil bobbin (not shown) on the core 32. As illustrated in FIG. 2, a first terminal 33A is connected to one end of the reading coil 33, and a second terminal 33B is connected to the other end of the reading coil 33. Also, a first terminal 34A is connected to one end of the writing coil 34, and a second terminal 34B is connected to the other end of the writing coil 34. The first terminal 33A, the second terminal 33B, the first terminal 34A, and the second terminal 34B are all arranged in the head case 21.

As illustrated in FIG. 4, the core 32 includes a linear portion 32a extending in the front to back direction X, coil winding portions 32b, 32c respectively protruding from end portions on one side and the other side of the linear portion 32a toward the lower side Z1 (toward the sensor surface 6a), and arm portions 32d, 32e extending from respective lower ends of the coil winding portions 32b, 32c toward the center of the core 32 in the front to back direction X. The gap 31 is formed between respective ends of the arm portions 32d, 32e opposite to each other in the front to back direction X. The gap 31 is positioned in the center of the core 32 in the front to back direction X. The reading coil 33 is wound via the coil bobbin on the coil winding portion 32b, and the writing coil 34 is wound via the coil bobbin on the coil winding portion 32c. In addition, the shape of the core and the arrangement of the coils are not limited to such shape and arrangement in the embodiment and may be changed as required.

The three head bodies 22 are arranged side by side in the width direction Y to be housed in the head case 21. As illustrated in FIG. 3B and FIG. 4, the gap 31 of each of the head bodies 22 is exposed to an outside of the head case 21 from the sensor surface opening 27 formed in the bottom plate portion 25 of the head case 21.

As illustrated in FIG. 2, the magnetic head 6 includes a demodulation circuit 52 configured to demodulate analogue signals output from the first terminal 33A and the second terminal 33B of the reading coil 33 of the head body 22, an encryption circuit 53 configured to encrypt a demodulated signal output from the demodulation circuit 52, and bidirectional diodes 54A, 54B respectively connected to the first terminal 34A and the second terminal 34B of the writing coil 34. The bidirectional diodes 54A, 54B are, for example, an element where a pair of diodes having a predetermined forward direction voltage are connected in opposite directions.

In addition, in FIG. 2, the single head body 22 is illustrated and the two bidirectional diodes 54A, 54B connected to the single head body 22 are illustrated; however, the same number of head bodies 22 as the channels are arranged in the multiple-channel magnetic head 6. That is, the number of head bodies 22 is three in the embodiment. In addition, the writing coil 34 of each of the head bodies 22 is connected via the bidirectional diodes 54A, 54B through the lead wires 80 to the output terminals 70A, 70B. Also, analogue signals output from the first terminal 33A and the second terminal 33B of the reading coil 33 of each of the head bodies 22 are input via the demodulation circuit 52 to the encryption circuit 53.

The encryption circuit 53 encrypts a demodulated signal with a predetermined encryption function and key data to output an encrypted signal. In addition, a filter circuit configured to remove noise may be provided between the first terminal 33A and the second terminal 33B of the reading coil 33 and the demodulation circuit 52. As described above, the encrypted signal output from the magnetic head 6 is output from the encryption circuit 53 to be input via the lead wire 80 to the body-side CPU 71.

The bidirectional diode 54A is arranged in series between the first terminal 34A of the writing coil 34 and the output terminal 70A of the aforementioned body-side board 70, and the bidirectional diode 54B is arranged in series between the second terminal 34B of the writing coil 34 and the output terminal 70B of the aforementioned body-side board 70. Therefore, write signals output from the write circuit 72 are input via the bidirectional diodes 54A, 54B to the writing coil 34. The write circuit 72 outputs the write signals at a voltage level above the forward direction voltage of the bidirectional diodes 54A, 54B.

The demodulation circuit 52 includes a demodulation IC 61 mounted on the control circuit board 62. Also, the encryption circuit 53 includes a CPU 63 mounted on the control circuit board 62. As illustrated in FIG. 4, the control circuit board 62 includes a first board surface 62A facing the lower side Z1 and a second board surface 62B facing the upper side Z2. The demodulation IC 61 is mounted on the first board surface 62A of the control circuit board 62, and the CPU 63 is mounted on the second board surface 62B of the control circuit board 62. The demodulation IC 61 is arranged so as to be located inward of the outline of the CPU 63 when viewed in the up-down direction Z. Also, the bidirectional diodes 54A, 54B are mounted on the first board surface 62A of the control circuit board 62. The demodulation IC 61 is connected, via a flexible wiring board (not shown) routed in the head case 21, to the first terminal 33A and the second terminal 33B respectively connected to one end and the other end of the reading coil 33. Also, in the same way as the demodulation IC 61, the bidirectional diodes 54A, 54B are connected, via a flexible wiring board (not shown) routed in the head case 21, to the first terminal 34A and the second terminal 34B respectively connected to one end and the other end of the writing coil 34.

As illustrated in FIG. 4, the control circuit board 62 is arranged so as to close the opening 28 of the head case 21 from the upper side Z2. The control circuit board 62 is fixed to the head case 21 via a resin 90 filled in the head case 21. The control circuit board 62 is configured such that a region in which the demodulation IC 61 and the bidirectional diodes 54A, 54B are mounted is opposed to the head case 21 in the up-down direction Z and such that the region of the first board surface 62A on which the demodulation IC 61 and the bidirectional diodes 54A, 54B are mounted is covered by the head case 21 from the lower side Z1. Thus, the demodulation circuit 52 and the bidirectional diodes 54A, 54B are arranged in the head case 21. The whole of the CPU 63 mounted on the second board surface 62B of the control circuit board 62 is sealed with a resin 91. The resin 91 is an epoxy resin.

Advantageous Effects

As described above, the card reader 1 according to the embodiment includes the magnetic head 6 configured to perform reading and writing of magnetic information. The bidirectional diodes 54A, 54B are arranged in the head case 21 of the magnetic head 6, and write signals are input via the bidirectional diodes 54A, 54B to the writing coil 34. Therefore, even when analogue signals corresponding to signals output from the reading coil 33 are output from the writing coil 34 at the time of reading of magnetic information by the reading coil 33, the analogue signals do not pass the bidirectional diodes 54A, 54B, therefore not being output from the magnetic head 6 toward the write circuit 72. Meanwhile, write signals at a voltage above the forward direction voltage are input from the write circuit 72 to the magnetic head 6, therefore passing the bidirectional diodes 54A, 54B to be input to the writing coil 34. The bidirectional diodes 54A, 54B are designed such that the resistance is very low against a signal at a voltage equal to or greater than the forward direction voltage. Accordingly, the feature of the magnetic head 6 for writing data is unlikely to be affected by the arrangement of the bidirectional diodes 54A, 54B.

Therefore, according to the embodiment, in the magnetic head 6 that can perform reading and writing of magnetic information, without performing a circuit switching operation, a signal can be prevented by the bidirectional diodes 54A, 54B from being output from the magnetic head 6 toward the write circuit 72. Consequently, a signal not encrypted between the magnetic head 6 and the write circuit 72 can be prevented from being read. Also, the bidirectional diodes 54A, 54B are small in size and the mounting area is small; therefore, the bidirectional diodes 54A and 54B are inexpensive. Consequently, improvement of security of the magnetic head 6 and downsizing and cost reduction of the magnetic head 6 can be realized.

In the embodiment, the bidirectional diodes 54A, 54B and the demodulation IC 61 are mounted on the first board surface 62A of the control circuit board 62, and the control circuit board 62 is fixed to the head case 21 such that the mounting area of the bidirectional diodes 54A, 54B and the demodulation IC 61 is covered by the head case 21. As just described, an electronic component configuring the bidirectional diodes 54A, 54B is mounted on the circuit board and thereby assembling, and routing and connecting of the bidirectional diodes 54A, 54B to the magnetic head 6 are facilitated. Also, the demodulation IC 61 and the bidirectional diodes 54A, 54B are mounted on the common control circuit board 62. Therefore, the structure of the magnetic head 6 can be simplified, and assembling, and routing and connecting are facilitated. Further, the magnetic head 6 is advantageously downsized. Furthermore, the CPU 63 configuring the encryption circuit 53 is mounted on the second board surface 62B facing the outside of the head case 21 and is covered by the resin 91. Therefore, it is not necessary to secure a space for arranging the CPU 63 in the head case 21. Consequently, the head case 21 can be downsized and the magnetic head 6 can be downsized.

Other Embodiments

In the above embodiment, the bidirectional diodes 54A, 54B are mounted on the control circuit board 62. Alternatively, the bidirectional diodes 54A, 54B may be mounted on a separate circuit board from the control circuit board 62 and may be arranged in the head case 21 to be fixed thereto with the resin 90. Also, an element (a pair of diodes) configuring the bidirectional diodes 54A, 54B connected with a lead wire may be arranged in the head case 21 to be fixed thereto with the resin 90. In addition, the circuit board on which the bidirectional diodes 54A, 54B are mounted may be fixed by a method other than the fixing method with the resin 90.

The invention claimed is:

1. A magnetic head, comprising:
   a head body, including a core that is provided with a gap, and a reading coil and a writing coil that are wound on the core;
   a head case, housing the head body;
   a demodulation circuit, being connected to the reading coil;
   an encryption circuit, being connected to the demodulation circuit; and
   a bidirectional diode, being connected to the writing coil, wherein the bidirectional diode is arranged in the head case, and
   a write signal is input via the bidirectional diode to the writing coil.

2. The magnetic head according to claim 1, further comprising:
   a circuit board, including a first board surface on which the bidirectional diode is mounted,
   wherein the circuit board is configured such that at least a region of the first board surface on which the bidirectional diode is mounted is covered by the head case.

3. The magnetic head according to claim 2, wherein
   the demodulation circuit is mounted on the first board surface, and
   the first board surface is configured such that at least a region on which the demodulation circuit and the bidirectional diode are mounted is covered by the head case.

4. The magnetic head according to claim 3, wherein
   the head case includes an opening,
   the circuit board is fixed to the head case such that the first board surface faces toward the head case while closing the opening, and
   the circuit board is configured such that the encryption circuit is mounted on a second board surface provided on a back side of the first board surface.

5. The magnetic head according to claim 1, wherein a resin is filled into the head case.

6. A magnetic recording medium processing device, comprising:
   the magnetic head, comprising:

a head body, including a core that is provided with a gap, and a reading coil and a writing coil that are wound on the core;

a head case, housing the head body;

a demodulation circuit, being connected to the reading coil;

an encryption circuit, being connected to the demodulation circuit; and a bidirectional diode, being connected to the writing coil, wherein the bidirectional diode is arranged in the head case, and a write signal is input via the bidirectional diode to the writing coil; and a write circuit, being connected via the bidirectional diode to the writing coil of the magnetic head.

* * * * *